United States Patent
Moran et al.

(10) Patent No.: US 7,139,890 B2
(45) Date of Patent: Nov. 21, 2006

(54) METHODS AND ARRANGEMENTS TO INTERFACE MEMORY

(75) Inventors: Douglas R. Moran, Folsom, CA (US); Clifford D. Hall, Orangevale, CA (US); Thomas A. Piazza, Granite Bay, CA (US); Richard W. Jensen, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 306 days.

(21) Appl. No.: 10/135,149

(22) Filed: Apr. 30, 2002

(65) Prior Publication Data

US 2003/0204693 A1 Oct. 30, 2003

(51) Int. Cl.
G06F 12/00 (2006.01)

(52) U.S. Cl. .................. 711/163; 711/152; 711/153; 711/173; 713/169; 713/182; 713/193; 713/201

(58) Field of Classification Search .............. 707/8, 707/9; 709/215, 226; 710/28, 38, 200; 711/149, 151, 152, 153, 163, 173; 713/162, 713/164, 169, 182, 193, 201
See application file for complete search history.

(56) References Cited

U.S. PATENT DOCUMENTS

| | | |
|---|---|---|
| 3,699,532 A | 10/1972 | Schaffer et al. |
| 3,996,449 A | 12/1976 | Attanasio et al. |
| 4,037,214 A | 7/1977 | Birney et al. |
| 4,162,536 A | 7/1979 | Morley |
| 4,207,609 A | 6/1980 | Luiz et al. |
| 4,247,905 A | 1/1981 | Yoshida et al. |
| 4,276,594 A | 6/1981 | Morley |
| 4,307,447 A | 12/1981 | Provanzano et al. |
| 4,319,233 A | 3/1982 | Matsuoka et al. |
| 4,319,323 A | 3/1982 | Ermolovich et al. |
| 4,347,565 A | 8/1982 | Kaneda et al. |
| 4,403,283 A | 9/1983 | Myntti et al. |
| 4,419,724 A | 12/1983 | Branigin et al. |
| 4,430,709 A | 2/1984 | Schleupen |
| 4,571,672 A | 2/1986 | Hatada et al. |

(Continued)

FOREIGN PATENT DOCUMENTS

DE 4217444 12/1992

(Continued)

OTHER PUBLICATIONS

Computer System Architecture, M. Morris Mano, 3rd ed., pp. 128-131, 1993.*

(Continued)

Primary Examiner—Christian P. Chace
(74) Attorney, Agent, or Firm—Blakely, Sokoloff, Taylor & Zafman LLP (57) ABSTRACT

Methods and arrangements to interface memory are described. Many embodiments comprise comparing a transaction or access from a source to memory addresses associated with the source to determine whether an address associated with the transaction is accessible by the source. Some embodiments may comprise defining protected memory. Several embodiments may comprise defining protected memory by, for example, determining a configuration for memory. Such embodiments may comprise protecting a memory location or limiting access to memory addresses associated with a protected memory location. Some of these embodiments may comprise accessing registers to define protected memory and verifying accesses to a memory location according to the definition of protected memory. Further embodiments may comprise generating an association between a source of an access and a memory location and storing the association to facilitate access to the memory location by the source.

14 Claims, 5 Drawing Sheets

U.S. PATENT DOCUMENTS

| | | |
|---|---|---|
| 4,759,064 A | 7/1988 | Chaum |
| 4,795,893 A | 1/1989 | Ugon |
| 4,802,084 A | 1/1989 | Ikegaya et al. |
| 4,975,836 A | 12/1990 | Hirosawa et al. |
| 5,007,082 A | 4/1991 | Cummins |
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,388,264 A * | 2/1995 | Tobias et al. ............ 707/103 R |
| 5,437,033 A | 7/1995 | Inoue et al. |
| 5,455,909 A | 10/1995 | Blomgren et al. |
| 5,459,867 A | 10/1995 | Adams et al. |
| 5,469,557 A | 11/1995 | Salt et al. |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,555,385 A | 9/1996 | Osisek |
| 5,555,414 A | 9/1996 | Hough et al. |
| 5,559,883 A * | 9/1996 | Williams .................... 713/201 |
| 5,560,013 A | 9/1996 | Scalzi et al. |
| 5,564,040 A | 10/1996 | Kubals |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,628,022 A | 5/1997 | Ueno et al. |
| 5,633,929 A | 5/1997 | Kaliski, Jr. |
| 5,668,971 A | 9/1997 | Neufeld |
| 5,684,948 A | 11/1997 | Johnson et al. |
| 5,706,469 A | 1/1998 | Kobayashi |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,809,546 A | 9/1998 | Greenstein et al. |
| 5,825,880 A | 10/1998 | Sudia et al. |
| 5,852,717 A | 12/1998 | Bhide et al. |
| 5,854,913 A | 12/1998 | Goetz et al. |
| 5,872,994 A | 2/1999 | Akiyama et al. |
| 5,901,225 A | 5/1999 | Ireton et al. |
| 5,919,257 A | 7/1999 | Trostle |
| 5,935,242 A | 8/1999 | Madany et al. |
| 5,935,247 A | 8/1999 | Pai et al. |
| 5,949,436 A * | 9/1999 | Horan et al. ................ 345/501 |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 6,035,374 A | 3/2000 | Panwar et al. |
| 6,044,478 A | 3/2000 | Green |
| 6,055,637 A | 4/2000 | Hudson et al. |
| 6,061,794 A | 5/2000 | Angelo et al. |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Isley |
| 6,148,379 A | 11/2000 | Schimmel |
| 6,173,417 B1 | 1/2001 | Merrill |
| 6,175,924 B1 | 1/2001 | Arnold |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakamura |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Davis |
| 6,292,874 B1 | 9/2001 | Barnett |
| 6,301,646 B1 | 10/2001 | Hostetter |
| 6,314,409 B1 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams |
| 6,374,286 B1 | 4/2002 | Gee et al. |
| 6,374,317 B1 | 4/2002 | Ajanovic et al. |
| 6,378,068 B1 | 4/2002 | Foster |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,445,797 B1 | 9/2002 | McGough et al. |
| 6,463,535 B1 | 10/2002 | Drews et al. |
| 6,463,537 B1 | 10/2002 | Tello |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B1 | 4/2003 | Vu et al. |
| 6,560,627 B1 | 5/2003 | McDonald et al. |
| 6,609,199 B1 | 8/2003 | DeTreville |
| 6,615,278 B1 | 9/2003 | Curtis |
| 6,633,962 B1 * | 10/2003 | Burton et al. ............... 711/163 |
| 6,633,963 B1 | 10/2003 | Ellison et al. |
| 6,633,981 B1 | 10/2003 | Davis |
| 6,647,387 B1 * | 11/2003 | McKean et al. ................ 707/9 |
| 6,651,171 B1 | 11/2003 | England et al. |
| 6,678,825 B1 | 1/2004 | Ellison et al. |
| 6,684,326 B1 | 1/2004 | Cromer et al. |
| 2001/0021969 A1 | 9/2001 | Burger et al. |
| 2001/0027511 A1 | 10/2001 | Wakabayashi et al. |
| 2001/0027527 A1 | 10/2001 | Khidekel et al. |
| 2002/0007456 A1 | 1/2002 | Peinado et al. |
| 2002/0023032 A1 | 2/2002 | Pearson et al. |
| 2002/0147916 A1 | 10/2002 | Strongin et al. |
| 2002/0166061 A1 | 11/2002 | Falik et al. |
| 2002/0169717 A1 | 11/2002 | Challener |
| 2002/0199071 A1 * | 12/2002 | Kitamura et al. ........... 711/152 |
| 2003/0018892 A1 | 1/2003 | Tello |
| 2003/0074548 A1 | 4/2003 | Cromer et al. |
| 2003/0115453 A1 | 6/2003 | Grawrock |
| 2003/0126442 A1 | 7/2003 | Glew et al. |
| 2003/0126453 A1 | 7/2003 | Glew et al. |
| 2003/0159056 A1 | 8/2003 | Cromer et al. |
| 2003/0188179 A1 | 10/2003 | Challener et al. |

2003/0196085 A1  10/2003  Lampson et al.

FOREIGN PATENT DOCUMENTS

| EP | 0473913 | 3/1992 |
| --- | --- | --- |
| EP | 0600112 | 8/1994 |
| EP | 0892521 | 1/1999 |
| EP | 0930567 A | 7/1999 |
| EP | 0961193 | 12/1999 |
| EP | 0965902 | 12/1999 |
| EP | 1 030 237 A | 8/2000 |
| EP | 1055989 | 11/2000 |
| EP | 1056014 | 11/2000 |
| EP | 1085396 | 3/2001 |
| EP | 1146715 | 10/2001 |
| EP | 1271277 | 1/2003 |
| JP | 02000076139 A | 3/2000 |
| WO | WO9524696 | 9/1995 |
| WO | WO 97/29567 | 8/1997 |
| WO | WO9812620 | 3/1998 |
| WO | WO9834365 A | 8/1998 |
| WO | WO9844402 | 10/1998 |
| WO | WO9905600 | 2/1999 |
| WO | WO9909482 | 2/1999 |
| WO | WO9918511 | 4/1999 |
| WO | WO9957863 | 11/1999 |
| WO | WO99/65579 | 12/1999 |
| WO | WO0021238 | 4/2000 |
| WO | WO0062232 | 10/2000 |
| WO | WO 01/27723 A | 4/2001 |
| WO | WO 01/27821 A | 4/2001 |
| WO | WO0163994 | 8/2001 |
| WO | WO 01 75564 A | 10/2001 |
| WO | WO 01/75565 | 10/2001 |
| WO | WO 01/75595 | 10/2001 |
| WO | WO0201794 | 1/2002 |
| WO | WO 02 17555 A | 2/2002 |
| WO | WO02060121 | 8/2002 |
| WO | WO 02 086684 A | 10/2002 |
| WO | WO03058412 | 7/2003 |

OTHER PUBLICATIONS

Heinrich, J., "MIPS R4000 Microprocessor User's Manual," 1994, MIPS Technology, Inc., Mountain View, CA, pp. 67-79.

Heinrich, J. "MIPS R4000 Microprocessor User's Manual," Apr. 1, 1993, MIPS, Mt. View, XP002184449, pp. 61-97.

"Information Display Technique for a Terminate Stay Resident Program," IBM Technical Disclosure Bulletin, TDB-ACC-No. NA9112156, Dec. 1, 1991, pp. 156-158, vol. 34, Issue No. 7A.

Robin, John Scott and Irvine, Cynthia E., "Analysis of the Pentium's Ability to Support a Secure Virtual Machine Monitor," Proceedings of the 9th USENIX Security Symposium, Aug. 14, 2000, pp. 1-17, XP002247347, Denver, CO.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

Brands, Stefan, "Restrictive Blinding of Secret-Key Certificates", Springer-Verlag XP002201306, (1995),Chapter 3.

Davida, George I., et al., "Defending Systems Against Viruses through Cryptographic Authentication", Proceedings of the Symposium on Security and Privacy, IEEE Comp. Soc. Press, ISBN 0-8186-1939-2,(May 1989).

Kashiwagi, Kazuhiko, et al., "Design and Implementation of Dynamically Reconstructing System Software", Software Engineering Conference, Proceedings 1996 Asia-Pacific Seoul, South Korea Dec. 4-7, 1996, Los Alamitos, CA, USA, IEEE Comput. Soc, US, ISBN 0-8186-7638-8,(1996).

Luke, Jahn , et al., "Replacement Strategy for Aging Avionics Computers", IEEE AES Systems Magazine, XP002190614,(Mar. 1999).

Menezes, Oorschot , " Handbook of Applied Cryptography", CRC Press LLC, USA XP002201307, (1997),475.

Richt, Stefan , et al., "In-Circuit-Emulator wird Ectzeittauglich", Elektronic, Franzis Verlag GMBH, Munchen, DE, vol. 40, No. 16, XP000259620,(100-103),Aug. 6, 1991.

Saez, Sergio , et al., "A Hardware Scheduler for Complex Real-Time Systems", Proceedings of the IEEE International Symposium on Industrial Electronics, XP002190615,(Jul. 1999),43-48.

Sherwood, Timothy , et al., "Patchable Instruction ROM Architecture", Department of Computer Science and Engineering, University of California, San Diego, La Jolla, CA, (Nov. 2001).

Heinrich, J., "MIPS R4000 Microprocessor User's Manual," April 1, 1993, MIPS, MT. View, XP002184449, pp. 61-97.

"M68040 User's Manual," 1993, Motorola, Inc., pp. 1-20.

"Intel 386 DX Microprocessor 32-Bit CHMOS Microprocessor with Integrated Memory Management," Dec. 31, 1995, Intel, Inc., pp. 32-56; figures 4-14.

Berg, C., "How Do I Create a Signed Applet?," Dr. Dobb's Journal, M&T Publ., Redwood City, CA, US, vol. 22, No. 8, Aug. 1997, pp. 109-111, 122.

Gong, L., et al., "Going Beyond the Sandbox: An Overview of the New Security Architecture in the Java Development Kit 1.2," Proceedings of the Usenix Symposium on the Internet Technologies and Systems, Monterrey, CA Dec. 1997, pp. 103-112.

Goldberg, R., "Survey of virtual machine research," IEEE Computer Magazine 7(6), pp. 34-45, 1974.

Gum, P.H., "System/370 Extended Architecture: Facilities for Virtual Machines," IBM J. Research Development, vol. 27, No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Aug. 9, 2001; pp. 1-31.

"Trust Computing Platform Alliance (TCPA)," Main Specification Version 1.1a, Compaq Computer Corporation, Hewlett-Packard Company, IBM Corporation, Intel Corporation, Microsoft Corporation, Dec. 2001.

Coulouris, George , et al., "Distributed Systems, Concepts and Designs", 2nd Edition, (1994),422-424.

Crawford, John , "Architecture of the Intel 80386", Proceedings of the IEEE International Conference on Computer Design: VLSI in Computers and Processors (ICCD '86), (Oct. 6, 1986), 155-160.

Fabry, R.S. , "Capability-Based Addressing", Fabry, R.S., "Capability-Based Addressing," Communications of the ACM, vol. 17, No. 7, (Jul. 1974),403-412.

Frieder, Gideon , "The Architecture And Operational Characteristics of the VMX Host Machine", The Architecture And Operational Characteristics of the VMX Host Machine, IEEE, (1982),9-16.

Intel Corporation, "IA-64 System Abstraction Layer Specification", Intel Product Specification, Order No. 245359-001, (Jan. 2000),1-112.

Intel Corporation, "Intel 82802AB/82802AC Firmware Hub (FWH)", Intel Product Datasheet, Document No. 290658-004,(Nov. 2000),1-6, 17-28.

Intel Corporation, "Intel IA-64 Architecture Software Developer's Manual", vol. 2: IA-64 System Architecture, Order No. 245318-001, (Jan. 2000),i, ii, 5.1-5.3, 11.1-11.8, 11.23-11.26.

Menezes, Alfred J., et al., "Handbook of Applied Cryptography", CRC Press Series on Discrete Mathematices and its Applications, Boca Raton, FL, XP002165287, ISBN 0849385237,(Oct. 1996),403-405, 506-515, 570.

Nanba, S. , et al., "VM/4: ACOS-4 Virtual Machine Architecture", VM/4: ACOS-4 Virtual Machine Architecture, IEEE, (1985),171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Shneier, Bruce, "Applied Cryptography: Protocols, Algorithm, and Source Code in C", *Wiley John & Sons, Inc.*, XP002939871; ISBN 0471117099,(Oct. 1995),47-52.

Schneier, Bruce , "Applied Cryptography: Protocols, Algorithm, and Source Code in C", *Wiley, John & Sons, Inc.*, XP002138607: ISBN 0471117099,(Oct. 1995),56-65.

Schneier, Bruce , "Applied Cryptography: Protocols, Algorithms, and Source Code C", *Wiley, John & Sons, Inc.*, XP0021111449; ISBN 0471117099,(Oct. 1995),169-187.

Schneier, Bruce, "Applied Cryptography: Protocols, Algorithms, and Source Code in C", *2nd Edition: Wiley, John & Sons, Inc.*, XP002251738; ISBN 0471128457 ,(Nov. 1995),28-33; 176-177; 216-217; 461-473; 518-522.

* cited by examiner

METHODS AND ARRANGEMENTS TO INTERFACE MEMORY

BACKGROUND

The increasing number of financial and personal transactions being performed on local or remote computers has instigated a need for the establishment of trustable or secure environments. More particularly, the secure environment attempts to address a problem of loss of privacy. For example, private data like credit card data, medical report data, bank account data, or the like, stored on a computer to facilitate transactions, or even to manage personal finances, may be accessed, corrupted or abused by another user of the same computer or by a networked system via a local area network (LAN), a wide area network (WAN), or by system interconnections established through access to the Internet. Users do not want their private data made public, altered or used in inappropriate transactions, regardless of whether the private data resides only on their personal computer or on a remote computer as a result of a transaction involving the private data across a network.

Existing systems provide little protection for private data unless the system is an isolated system. Isolated systems may utilize a closed set of only trusted software. Although these systems do not account for attacks from within the computer or network, such systems provide protection against outside attacks from potentially hostile code. These systems, however, are disadvantageous to the extent that they do not allow the simultaneous use of common, commercially available operating system and application software. Further, the establishment of larger networks degrades the protections offered for the private data and a side effect of the isolation, for example, prevents exchange of private data with an on-line banking system.

Other systems allow potentially hostile code or hardware to access private data by directly or indirectly accessing the memory storing the private data through, for instance, direct memory access (DMA) channels or a graphics aperture. DMA is a technique for transferring data between main memory and a device without passing it through the processor. Some expansion boards, such as CD-ROM cards, are capable of accessing the computer's DMA channel. The graphics aperture is a range of addresses that can be translated by an input-output (I/O) hub. The addresses accessed by a graphics card, for example, may be non-contiguous in main memory so the addresses may be translated via an address translation table such as a graphics address relocation table (GART) or a cache copy of the address translation table such as in a GART translation look-aside buffer (GTLB). The potentially hostile code or hardware can also access targeted memory locations indirectly by modifying the address translation table or by updating an operating system with code to make modifications to the targeted memory location or the address translation table. Modifying an address translation table can cause private data to be written to a memory location directly accessible to the hostile code or device or can allow addresses available for DMA to translate into a memory address for private data, comprising the security for the private data.

BRIEF FIGURE DESCRIPTIONS

In the accompanying drawings, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments. The variations of embodiments anticipated for the present invention are too numerous to discuss individually so the detailed descriptions below are designed to make such embodiments obvious to a person of ordinary skill in the art.

Methods and arrangements to interface memory are described. Many embodiments comprise comparing a transaction or access from a source to memory addresses associated with the source to determine whether an address associated with the transaction is accessible by the source. Some embodiments may comprise defining protected memory. Several embodiments may comprise defining protected memory by, for example, determining a configuration for memory. Such embodiments may comprise protecting a memory location or limiting access to memory addresses associated with a protected memory location. Some of these embodiments may comprise accessing registers to define protected memory and verifying accesses to a memory location according to the definition of protected memory. Further embodiments may comprise generating an association between a source of an access and a memory location and storing the association to facilitate access to the memory location by the source.

Figure 1:
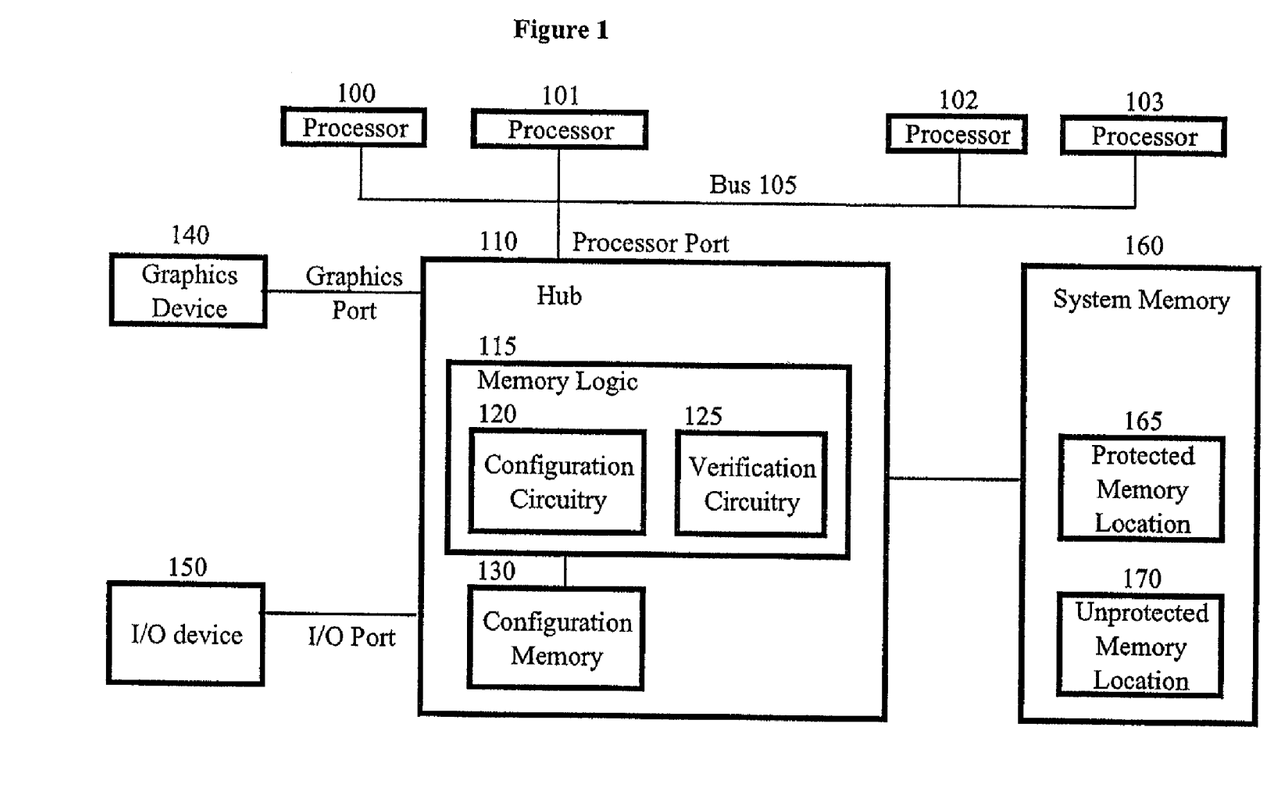
FIG. 1 depicts an embodiment of a processor-based system with a hub to interface memory.

Referring now to FIG. 1, there is shown an embodiment of a processor-based system with a hub 110 to interface system memory 160. The embodiment may comprise processors such as processors 100, 101, 102, and 103; bus 105; hub 110; graphics device 140; I/O device 150; and system memory 160. Processors 100, 101, 102, and 103 may execute instructions in response to requests from secure environment software, operating system software, and application software. In particular, processors 100, 101, 102, and 103 and input-output (I/O) devices such as graphics device 140 and I/O device 150 may couple with hub 110 to access the contents of system memory 160. In some embodiments, processors 100, 101, 102, and 103 may also receive an access from an I/O device like graphics device 140 and translate an address associated with the access via hub 110. In further embodiments, hub 110 may translate the address associated with the access. In alternative embodiments, one to more than four processors may be coupled with hub 110 via bus 105.

Bus 105 may comprise a bus and corresponding circuitry to facilitate access to system memory 160. In the present embodiment, bus 105 may comprise hardware to facilitate transactions to and from more than one processor.

Hub 110 may interface system memory 160 for processors 100, 101, 102, and 103 and I/O devices like graphics device 140 and I/O device 150. Hub 110 may comprise memory logic 115 and configuration memory 130. Memory logic 115 may couple with system memory 160 to associate memory addresses with the locations 165 and 170 in response to a request, to associated a source of an access with the locations 165 and 170 based on the request, and to approve the access by the source to system memory 160 after verification that the access is consistent with an association between the source and the locations 165 and 170. The source may comprise, for instance, microcode executed by a processor, code or a thread executed by one or more processors 100, 101, 102, and 103, code such as operating system or application software, or a device such as an I/O device. For example, hub 110 may initiate a secure environment in response to a request from an initiating logical processor (ILP) such as processor 100 or a thread executed by processor 100, 101, 102, and/or 103. The ILP and/or a remote logical processor (RLP) such as processors 101, 102, and 103 or a thread may request or initiate a request in hub 110 to define protected memory. In some embodiments, defining protected memory may comprise defining a protected memory location 165, an unprotected memory location 170, or both by associating a memory address with protected memory location 165 or unprotected memory location 170. After defining protected memory, the ILP and/or a remote logical processor or a thread may execute a code such as SVMM to manage a secure environment, store the code in protected memory location 165, and associated the protected memory location 165 with the code such that the code may access the protected memory location 165.

Memory logic 115 may define protected memory and verify an access based upon the definition of protected memory. Memory logic 115 may comprise configuration circuitry 120 and verification circuitry 125. Configuration circuitry 120 may generate data to associate the source of an access with the locations 165 and 170 in response to a request to define protected memory. In such embodiments, configuration circuitry 120 may store the data based upon a request to define protected memory, wherein the request may comprise a reference to a code or other device as the source of an access to associate the source with unprotected memory location 170 and/or protected memory location 165. For example, an I/O device such as graphics device 140 and/or I/O device 150 may request to define protected memory and configuration circuitry 120 may generate a definition of protected memory for the I/O device. Configuration circuitry 120 may determine a memory location accessible by the device in response to the request and may generate data to associate the device with the memory location. The memory location may comprise a memory address associated with part of protected memory location 165 and/or may comprise a memory address to define as protected memory location 165 for the device. In some embodiments, configuration circuitry 120 may generate data in the form of a table for the device and store the data in system memory 160. In other embodiments, configuration circuitry 120 may store data to associate a code or device with a protected memory location 165 and/or an unprotected memory location 170 in configuration memory 130.

In many embodiments, configuration circuitry 120 may store the data in a table to associate a memory location with a source of an access. The data may describe memory addresses that are accessible or are not accessible by the source. In such embodiments, configuration circuitry 120 may store the data based upon an access by the source to associate the source with protected memory location 165 and/or unprotected memory location 170 with the table. For instance, a port or I/O interface may request to define protected memory based upon an access by a source and the request may associate a source with a part of protected memory location 165 based upon the request.

Verification circuitry 125 may couple with configuration circuitry 120 to receive an access and determine whether the access is permissible in accordance with the definition of protected memory. For example, verification circuitry 125 may receive an access from SVMM to write to protected memory location 165. In response, verification circuitry 125 may compare the write request with the definition of protected memory generated by configuration circuitry 120. When the definition associates SVMM with a write to the protected memory location 165 of the access, verification circuitry 120 may approve the access. On the other hand, another code of the secure environment may request a write to part of protected memory location 165 that may comprise code for SVMM. Verification circuitry 125 may determine that a write to that part of protected memory location 165 is not associated with the code and verification circuitry 125 may not approve the access. In some embodiments, a read for the same part of protected memory location 165 may be associated with the code so an access by the code comprising a read request may be approved.

In several embodiments, verification circuitry 125 may approve an access based upon a table to associate the source of the access with the locations 165 and 170, wherein the access is associated with the locations 165 and 170. In many of these embodiments, configuration circuitry 120 may store data to associate a source of an access with a device or code in the table. The table may comprise one or more registers configured to associate the device with the locations 165 and 170 or may comprise a table in system memory 160. In one embodiment, the table may be stored in protected memory location 165. Verification circuitry 125 may compare the access with data in the table to determine whether the memory location associated with the access is accessible by the source. In further embodiments, verification circuitry 125 may compare the type of access, e.g. a read request or a write request, to the type of access associated with the source in the table.

In another embodiment, verification circuitry 125 may comprise circuitry to determine an address translation associated with an access to determine whether the access may be approved. For instance, an access from graphics device 140 may comprise an abbreviated memory address or an alias for a memory address in system memory 160. Verification circuitry 125 may translate the abbreviated memory address or alias via an address translation table and compare the translated address to the definition of protected memory generated by configuration circuitry 120.

In some embodiments, memory logic 115 may comprise configuration memory 130. Configuration memory 130 may couple with memory logic 115 to store an association between the memory addresses and the locations 165 and 170. In many embodiments, configuration memory 130 may receive data to describe a definition of protected memory and store the data to associate memory addresses of system memory 160 with locations 165 and 170. In a number of these embodiments, the definition may associate memory addresses with the protected memory location 165 and the remainder of the system memory 160 may comprise the memory addresses associated with unprotected memory location 170, or vice versa.

In several embodiments, configuration memory 130 may comprise a register. The register may be configured by memory logic 115 to associate the locations 165 and 170 with memory addresses. In some embodiments, storing an association in a register may indicate a source that has access to the memory address. In other embodiments, configuration memory 130 may store an association in a register to indicate that memory address may not be accessible by a source associated with the register. In further embodiments, configuration memory 130 may comprise a buffer, queue, or the like to store the association and/or the memory address.

Graphics device 140 may comprise an I/O device for graphics and may couple with hub 110 via a bus such as an accelerated graphics bus (AGP) or the like. Graphics device 140 couple with hub 110 to access memory addresses of system memory 160. In some embodiments graphics device 140 may request a memory location in system memory 160 via hub 110. Hub 110 may determine memory addresses within system memory 160 that are accessible by graphics device 140 and may generate data to facilitate access by graphics device 140. For example, graphics device 140 may comprise a limited amount of memory and may request access to system memory 160 to store more data. In response to the request, hub 110 may select part of protected memory location 165 or associate additional addresses with protected memory location 165 to provide graphics device 140 with more memory. Hub 110 may associate the selected or added part of protected memory location 165 with graphics device 140. After receiving an access from graphics device 140, hub 110 may verify that the memory address associated with the access is associated with graphics device 140 and may approve the access, without, for instance, requesting further approval for the access by the secure environment.

I/O device 150 may comprise, for instance, a peripheral component interconnect (PCI) card, universal serial bus (USB) card, switch, or the like to provide access to system memory 160 by I/O devices or may comprise an I/O device such as third generation I/O architecture (3GIO) cards, integrated drive electronics (IDE) cards, audio controllers (AC) like AC 97, USB devices, or the like. For example, I/O device 150 may interconnect one or more point-to-point bus for an I/O device to hub 110 to provide access to system memory 160. In response to an access or a request to determine a memory location accessible by the I/O device 150, or a device coupled with I/O device 150, hub 110 may determine a memory location such as part of protected memory location 165 and/or part of unprotected memory location 170. Hub 110 may then associate the part(s) with I/O device 150 and/or an I/O device coupled with I/O device 150 to facilitate access to the memory location. As a result, hub 110 may be capable of verifying an access via I/O device 150 without requesting verification by a processor 100, 101, 102 and 103 or a thread operating on processors 100, 101, 102 and/or 103.

System memory 160 may comprise volatile or non-volatile memory such as random access memory (RAM), flash memory, or the like. In one embodiment, system memory 160 may comprise dynamic random access memory (DRAM). After generating a definition of protected memory, system memory 160 may comprise memory addresses associated with protected memory location 165 and unprotected memory location 170.

Figure 2:
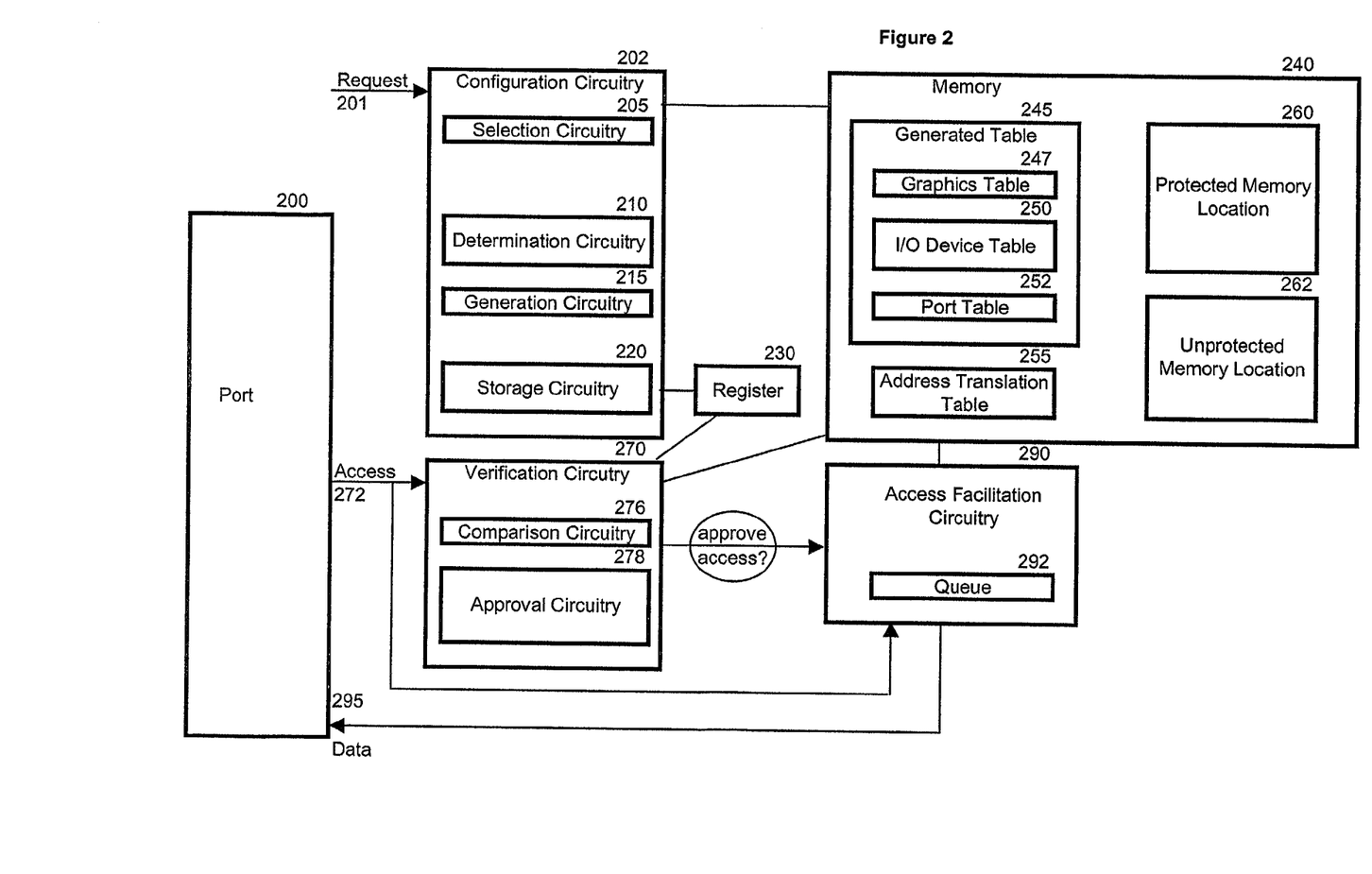
FIG. 2 depicts an embodiment of an apparatus with a circuitry to interface memory for a port.

Referring now to FIG. 2, there is shown an embodiment of an apparatus to interface memory. The embodiment may comprise port 200, configuration circuitry 202, register 230, verification circuitry 270, memory 240, and access facilitation circuitry 290. Port 200 may receive a request 201 or receive an access 272 and forward request 201 to define protected memory. In some embodiments, request 201 may comprise a request to define a protected memory location 260 for an I/O device coupled with port 200 or for port 200. In other embodiments, the request 201 may comprise a request to define an unprotected memory location 262. In further embodiments, request 201 may comprise access 272. In several embodiments, defining protected memory may comprise determining a memory location accessible by the device and/or by port 200. For example, port 200 may receive access 272 from a device and generate a request 201 for a memory location accessible to port 200 to facilitate approval of accesses from port 200 by verification circuitry 270.

Configuration circuitry 202 may receive request 201 to define protected memory and may generate a definition of protected memory based upon request 201. In one embodiment, in particular, configuration circuitry 202 may determine a memory location accessible by a device based upon request 201 for a memory location and may generate data to associate the memory location with the device. In alternative embodiments, configuration circuitry 202 may determine a memory location that may not be accessible by the device.

In some embodiments, configuration circuitry 202 may receive the request 201 from port 200. In other embodiments, configuration circuitry 202 may receive request 201 from a processor or a thread executed by a processor. For example, configuration circuitry 202 may receive request 201 to define protected memory for port 200, determine unallocated memory addresses of memory 240, and associate the memory addresses with a memory location for accesses via port 200. Approval to access the memory location may comprise approval by verification circuitry 270 to reduce the latency of accesses via port 200. Further, a device coupled with port 200 may request a memory location to be associated with the device rather than with port 200 in general.

Configuration circuitry 202 may comprise selection circuitry 205, determination circuitry 210, generation circuitry 215, and storage circuitry 220. Selection circuit 205 may select an address of memory 240 to associate with protected memory location 260 in response to request 201. For example, configuration circuitry 202 may receive request 201 to define protected memory. In response, selection circuitry 205 may determine unallocated memory addresses, contiguous or non-contiguous, and associate the memory addresses with protected memory location 260 and/or unprotected memory location 262 for access by a source of accesses associated with request 201.

Determination circuitry 210 may determine a protected memory location 260 and/or an unprotected memory location 262 to associate the protected memory location 260 and/or unprotected memory location 262 with a permissible access based upon the request 201. In some instances, determination circuitry 210 may determine whether memory addresses associated with an existing protected memory location 260 and/or unprotected memory location 262 may be accessible by the device. For example, an existing protected memory location 260 and/or unprotected memory location 262 may comprise memory locations established for a secure environment and/or for port 200. Determination circuitry 210 may check the definition of protected memory that established the locations 260 and 262 to determine the memory addresses that may be accessible to the device and associate the device with those locations 260 and 262. Further, based upon the request 201, determination circuitry 210 may establish additional locations 260 and/or 262 for port 200 or the device.

Generation circuitry 215 may generate an association between an address of memory and protected memory location 260 or unprotected memory location 262. Further, generation circuitry 215 may generate an association between a device and a memory location to facilitate access to memory 240. In many embodiments, generating an association may comprise generating data such as a memory address to store in register 230, generated table 245, and/or address translation table 255. For example, configuration circuitry 202 may define protected memory by assigning a memory address to protected memory location 260. After selecting a memory address, the memory address may be stored in register 230. The memory address may be accessible to port 200 for read requests but not for write requests, so data such as the memory address may be generated to associate a read request from port 200 with the memory address and the data may be stored in generated table 245. In some instances, the memory address received from a device to couple with port 200 may initiate access 272 with an abbreviated memory address so generation circuitry 215 may generate data such as an address translation to associate the abbreviated memory address with the memory address and store the data in address translation table 255.

In some embodiments, store circuitry 220 may store an association between an address of memory and protected memory location 260. For instance, port 200 may forward request 201 to configuration circuitry 202 to define a protected memory location 260. After generating an association between the memory addresses and protected memory location 260, storage circuitry 220 may store the memory addresses in register 230 to associated the memory addresses with protected memory location 260. In several embodiments, storage circuitry 220 may configure or extend register 230 to store the association.

In many embodiments, storage circuitry 220 may store the association between the device and the memory location. In some of these embodiments, storing an association between the device and the memory location may comprise storing the association in generated table 245 and/or in address translation table 255. In further embodiments, storing an association may comprise storing data such as a memory address, memory address translation, device identification (ID), or the like in memory 240 to provide low latency accesses for access 272 or another access. In other embodiments, storing an association may comprise storing data to associate a memory address with a device or code in memory other than memory 240.

Register 230 may comprise memory to associate a device or code with a protected memory location 260 and/or an unprotected memory location 262. In some embodiments, register 230 may comprise a control register or the like. In other embodiments, register 230 may comprise a buffer or the like. In further embodiments, register 230 may comprise memory to associate a device or code with memory addresses that may not be accessible to the device or code.

Referring still to FIG. 2, verification circuitry 270 may couple with configuration circuitry 202 to receive an access 272 and determine whether the access 272 is permissible in accordance with the definition of protected memory. In one embodiment in particular, verification circuitry 270 may couple with configuration circuitry 202 to approve an access 272 by a device to a memory location based upon the data to associate the memory location with the device. The memory location may be associated with one or more addresses in memory 240.

Verification circuitry 270 may comprise comparison circuitry 276 and approval circuitry 278. Comparison circuitry 276 may compare the access 272 to the definition of protected memory or to data to associate addresses with a memory location. For example, verification circuitry 270 may receive an access 272 from an embedded USB controller. Data associating the USB controller with a memory location accessible by the USB controller may be stored in a table format in I/O device table 250. Comparison circuitry 276 may determine that I/O device table 250 comprises the memory address associated with access 272.

Under other circumstances, comparison circuitry 276 may determine an address translation to compare access 272 to a definition of protected memory. Access 272 may comprise an alias for a memory address of memory 240. Comparison circuitry 276 may translate the alias based upon an entry in address translation table 255 and compare the translated address to an address associated with port 200.

Approval circuitry 278 may approve the access 272 based upon the definition of protected memory and/or based upon an associated or data, and in some embodiments, facilitate access 272 by forwarding the access 272 to access facilitation circuitry 290. In other embodiments, approval circuitry 278 may forward an approval of access 272 to access facilitation circuitry 290. For instance, approval circuitry 278 may receive the results of a comparison of an address associated with access 272 and approve the access to proceed based upon an association between a device such as a graphics device and the memory address associated with access 272. Approval circuitry 278 may signal access facilitation circuitry 290 to indicate that access 272 is approved.

In many embodiments, verification circuitry 270 may comprise a queue or buffer to store access 272 until access 272 is approved to facilitate another access. For example, approval circuitry 278 may store access 272 in a queue after receipt of access 272. While comparison circuitry 276 may determine an address translation for an alias associated with access 272, a subsequent access may be received. Circuitry of comparison circuitry 276 may begin to compare an address of the subsequent access with generated table 245 while awaiting an address translation for access 272. Then comparison circuitry 276 may receive a positive result for comparison of the subsequent access and forward the result to approval circuitry 278. After approval circuitry 278 approves the subsequent access, approval circuitry 278 may approve access 272. Then, access facilitation circuitry 290 may receive an indication to proceed with the subsequent access before receiving an indication to proceed with access 272. On the other hand, after determining an address associated with access 272 may not be stored in generated table 245, approval circuitry 278 may ignore access 272, withhold approval for access 272, forward access 272, or the like.

In further embodiments approval circuitry 278 may prevent access 272 when access 272 comprises a request to modify an address translation wherein the address translation is based upon the definition of protected memory. Withholding approval of access 272 may indicate that access 272 is erroneous or that access 272 may be an attempt to gain access to data protected from the source of access 272. For example, a hostile code or device may initiate an access 272 to modify address translation table 255 to allow access to data intended for protected memory location 260 or to cause an access determined to be an access for unprotected memory location 262 to access protected memory location 260. In either case, approval circuitry 278 may prevent access 272 by implementing a protection mechanism such as setting a flag to indicate the erroneous or potentially hostile access by the source of the access 272, blocking subsequent access by the source of access 272, shutting down a secure environment associated with the corresponding protected memory location 260, shutting down the system, encrypting the data contained by protected memory location 260, or the like.

Memory 240 may comprise storage for data. Memory 240 may comprise generated table 245, address translation table 255, protected memory location 260, and unprotected memory location 262. Generated table 245 may store data to associate memory addresses of memory 240 with devices or code such as I/O devices, an operating system, secure environment code, application code, or the like. Generated table 245 may comprise graphics table 247, I/O device table 250, and/or port table 252. Graphics table 247 may comprise one or more tables associated with a graphics port to indicate addresses associated with the graphics port. In many embodiments, graphics table 247 may comprise data like addresses or references to addresses that are accessible by transactions received via a graphics port such as port 200.

I/O device table 250 may comprise one or more tables of data to associate I/O devices with memory addresses such as memory addresses associated with protected memory location 260 and unprotected memory location 262. In some embodiments, I/O device table 250 may be associated with a device ID or a range of device ID's. Port table 252 may comprise data to associate port 200 and/or another port with memory locations such as protected memory location 260 or unprotected memory location 262.

Address translation table 255 may store data to associate or translate an abbreviated address or alias with a memory address of memory 240. Address translation table 255 may comprise one or more tables to store the data. For instance, address translation table 255 may comprise a table for each device that may use an alias or abbreviated address in an access for memory 240.

In alternative embodiments, generated table 245, a table within generated table 245, or address translation table 255 may be located in other memory such as flash memory, integrated synchronous random access memory (SRAM), integrated DRAM, core memory or the like. Integrated SRAM or DRAM, for example, may comprise memory integrated in an apparatus such as a hub or chipset.

Protected memory location 260 may be associated with one or more devices or code and may comprise an association of contiguous and/or non-contiguous memory addresses. The contiguous and/or non-contiguous memory addresses may provide protected or access-limited memory to store data. For instance, one or more devices or code may store data in protected memory location 260 and authorize access to the data to a limited number of devices and/or code modules. In some embodiments, generated table 245 and/or address translation table 255 may be located in memory addresses associated with protected memory location 260. Unprotected memory location 262 may comprise an association of contiguous and/or non-contiguous memory addresses to store data for access by devices or code. In some embodiments, unprotected memory location 262 may comprise the memory addresses that are not associated with protected memory location 260, or vice versa.

Access facilitation circuitry 290 may perform access 272 in response to approval of access 272 by verification circuitry 270. In some embodiments, access facilitation circuitry 290 may respond to the access 272 via port 200 with data such as data 295. In other embodiments, access facilitation circuitry 290 may perform access 272, such as a read request, and respond to access 272 based upon approval by verification circuitry 270. For instance, when access 272 comprise a write request, a completion may be returned to port 200 to indicate that the write request has been performed. In other embodiments, data 295 may comprise a pattern of bits such as all zeroes, all ones, or a known bad data pattern. In further embodiments, no response to the transaction may be transmitted. In many of these embodiments, the lack of a response may hang the system when the system is under attack. In some embodiments, the system or part thereof, may be reset.

In several embodiments, access facilitation circuitry 290 may comprise queue 292, buffer or the like to store access 272 and/or a response to access 272 while awaiting approval. In some embodiments, access facilitation circuitry 290 may receive an access 272 and wait for an approval from verification circuitry 270 to proceed with the access 272. In such embodiments, access 272 may be received directly from port 200. In further embodiments, access facilitation circuitry 290 may comprise circuitry such as disapproval circuitry. For instance, approval circuitry 278 may transmit a signal to indicate that access 272 may not have been approved. In response, access facilitation circuitry 290 may not implement access 272 and disapproval circuitry may implement a protection mechanism such as setting a flag to indicate the erroneous or potentially hostile access by the source of the access 272, blocking subsequent access by the source of access 272, shutting down a secure environment associated with the corresponding protected memory location 260, shutting down the system, encrypting the data contained by protected memory location 260, or the like.

Figure 3:
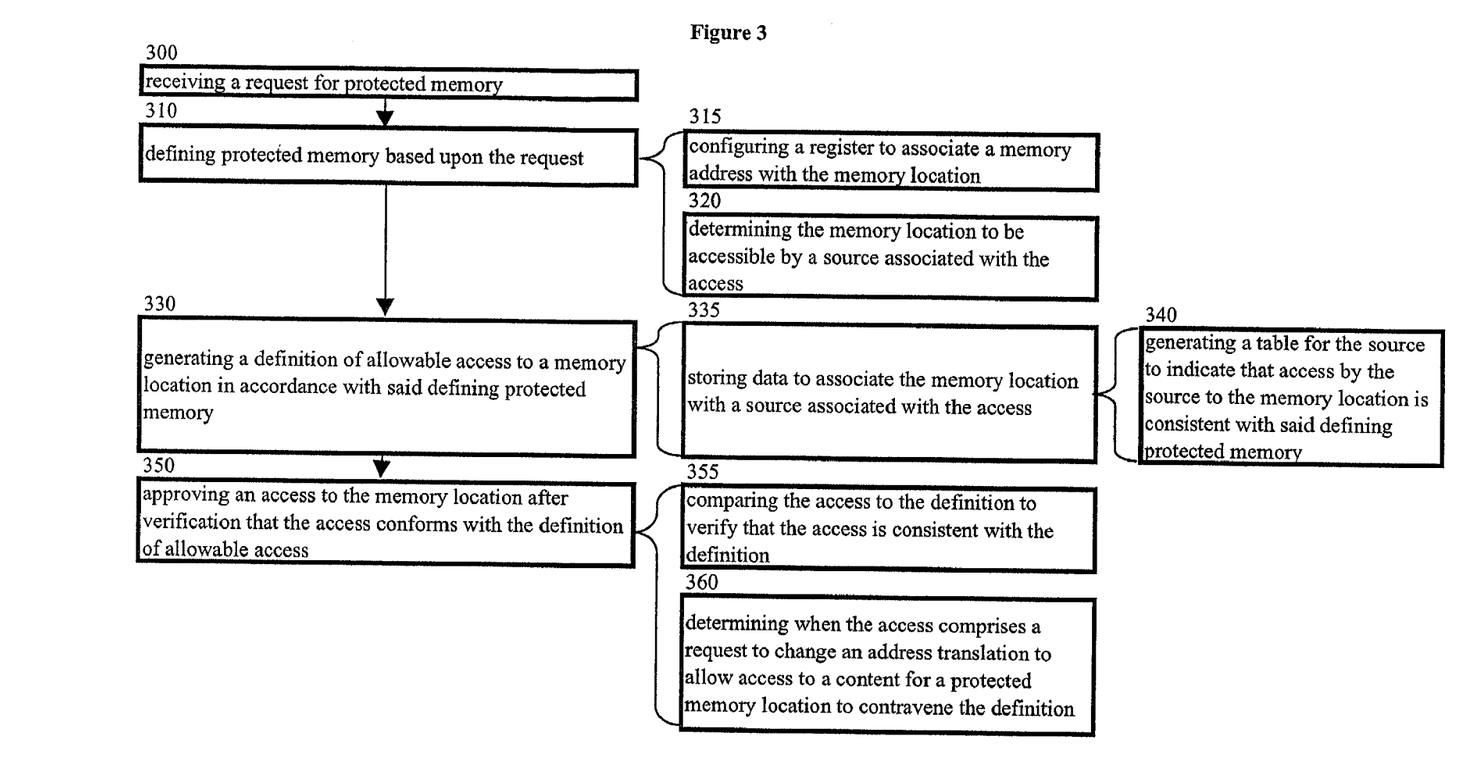
FIG. 3 depicts a flow chart of an embodiment to interface memory.

Referring now to FIG. 3, there is shown a flow chart of an embodiment to interface memory. The embodiment comprises receiving a request for protected memory 300; defining protected memory based upon the request 310; generating a definition of allowable access to a memory location in accordance with said defining protected memory 330; and approving an access to the memory location after verification that the access conforms with the definition of allowable access 350. Receiving a request for protected memory 300 may comprise receiving a request to define a protected memory location, an unprotected memory location, or both, or a request to define a memory location to associate a device or code with a protected memory location and/or an unprotected memory location.

Defining protected memory based upon the request 310 may associate a memory address or location with a protected memory location or an unprotected memory location and may associated the memory location with a device or code. Defining protected memory based upon the request 310 may comprise configuring a register to associated a memory address with the memory location 315 and determining the memory location to be accessible by a source associated with the access 320. Configuring a register to associate a memory address with the memory location 315 may comprise storing an association such as a memory address, abbreviated memory address, or data associated with a memory address in one or more registers to indicate that access to that memory location may be limited or to indicate that access to that memory location may be approved for one or more sources such as devices or code.

Determining the memory location to be accessible by a source associated with the access 320 may comprise determining whether part of an unprotected or a protected memory location may be accessible by the source. In some embodiments, determining the memory location to be accessible by a source associated with the access 320 may comprise determining whether part of an unprotected or a protected memory location may be inaccessible by the source.

In further embodiments, determining the memory location to be accessible by a source associated with the access 320 may comprise selecting memory addresses to associate with a protected memory location or an unprotected memory location. Many of these embodiments may comprise selecting unused or unallocated memory addresses to associate with a memory location. Selecting unused or unallocated memory addresses to associate with a memory location may select contiguous and/or non-contiguous memory addresses. In some of these embodiments, determining the memory location to be accessible by a source associated with the access 320 may comprise selecting a number of memory addresses based upon a request to define protected memory.

Generating a definition of allowable access to a memory location in accordance with said defining protected memory 330 may generate data to associate a memory location or memory addresses with a source that may have access to the memory location or addresses. Generating a definition of allowable access to a memory location in accordance with said defining protected memory 330 may comprise storing data to associate the memory location with a source associated with the access 335. Storing data to associate the memory location with a source associated with the access 335 may store one or more addresses or data corresponding to one or more addresses in memory.

Storing data to associate the memory location with a source associated with the access 335 may comprise generating a table for the source to indicate that access by the source to the memory location is consistent with said defining protected memory 340. Generating a table for the source to indicate that access by the source to the memory location is consistent with said defining protected memory 340 may comprise storing data to associate memory addresses accessible to the source and/or inaccessible to the source along with data corresponding to the source. For instance, a table may be associated with a device ID and the addresses stored within the table may comprise a memory location accessible to the source.

Approving an access to the memory location after verification that the access conforms with the definition of allowable access 350 may check a memory address associated with an access to determine whether the access is approved. In some embodiments, approving an access 350 may forward an approval to circuitry to facilitate the access.

Approving an access to the memory location after verification that the access conforms with the definition of allowable access 350 may comprise comparing the access to the definition to verify that the access is consistent with the definition 355 and determining when the access comprises a request to change an address translation to allow access to a content for a protected memory location to contravene the definition 360. Comparing the access to the definition to verify that the access is consistent with the definition 355 may comprise comparing an address associated with the access to the contents of a table associated with the source of the access or the memory address to verify that access to the address has been approved for the source of the access.

Determining when the access comprises a request to change an address translation to allow access to a content for a protected memory location to contravene the definition 360 may comprise determining an address or data corresponding to an address may cause a change to an address translation. In some situations, determining when the access comprises a request to change an address translation to allow access to a content for a protected memory location to contravene the definition 360 may also comprise determining that the change to the address translation may cause data intended to be written to a protected memory location to be written to an unprotected memory location. In other situations, determining when the access comprises a request to change an address translation to allow access to a content for a protected memory location to contravene the definition 360 may also comprise determining that change may allow an access to an unprotected memory location to access a protected memory location. In many of these embodiments, the access may be ignored or an error may be returned to the source. In further embodiments, a protection mechanism may be initiated to prevent potentially hostile code from accessing the content of a protected memory location.

Figure 4:
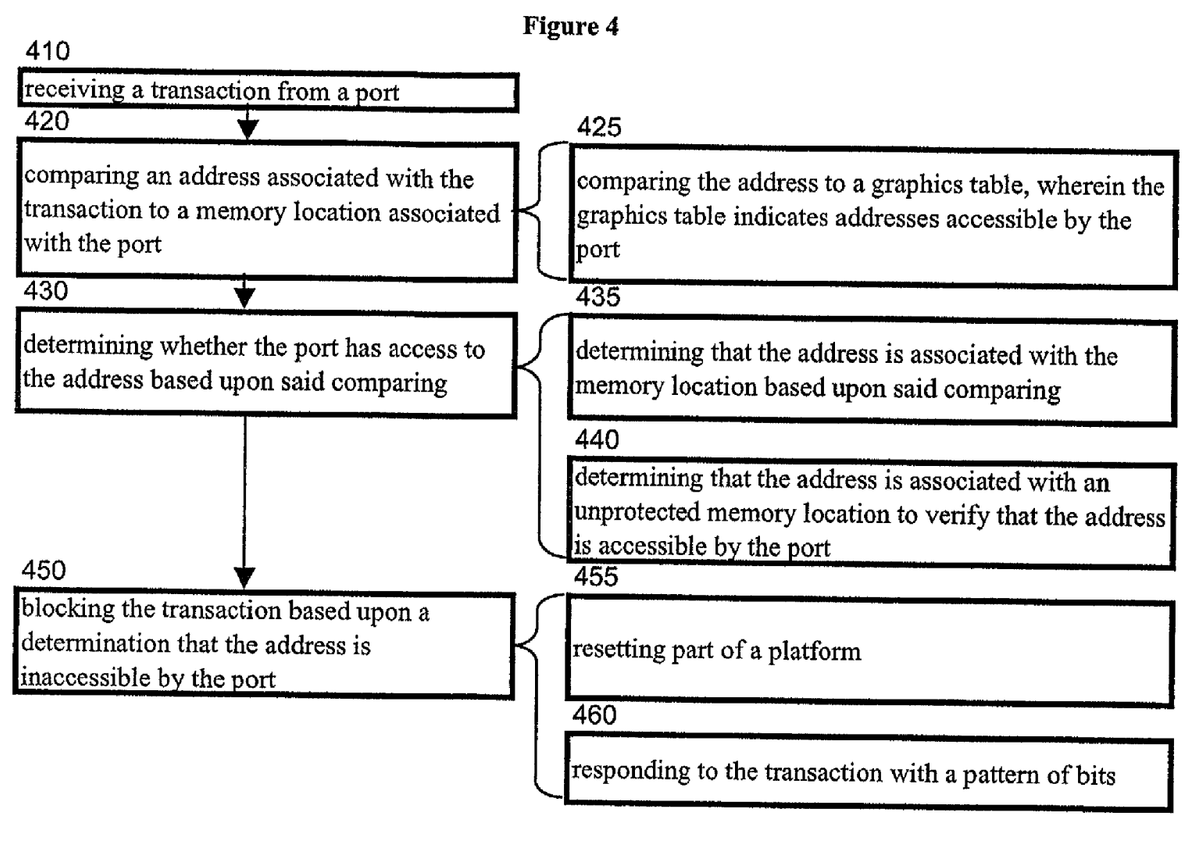
FIG. 4 depicts another flow chart of an embodiment to interface memory.

Referring now to FIG. 4, there is shown a flow chart of an embodiment to interface memory. The embodiment comprises receiving a transaction from a port 410; comparing an address associated with the transaction to a memory location associated with the port 420; determining whether the port has access to the address based upon said comparing 430; and blocking the transaction based upon a determination that the address is inaccessible by the port 450. Receiving a transaction from a port 410 may comprise receiving an access via a port for an external or integrated graphics controller, LAN (local area network) card, USB card, serial advanced technology attachment (ATA) card, or small computer system interface (SCSI) card. An integrated graphics controller, for instance, may comprise a graphics controller integrated in a chipset or hub.

Comparing an address associated with the transaction to a memory location associated with the port 420 may compare the address targeted by the transaction to a memory location associated with the port. For instance, the addresses of system memory may be associated with the port to indicate that the port may access the memory addresses. In some embodiments, more than one memory location may be associated with the port based upon logical ports associated with the port. For example, devices or groups of devices may be associated with logical ID's and each logical ID may be associated with a memory location. In one embodiment, a logical ID may comprise the last bit of a device address so a memory location may be established for even numbered devices and a different memory location may be established for odd numbered devices. After a transaction or access is received by the port, the address of the transaction may be compared with the corresponding memory location.

Comparing an address associated with the transaction to a memory location associated with the port 420 may comprise comparing the address to a graphics table, wherein the graphics table indicates addresses accessible by the port 425. Comparing the address to a graphics table, wherein the graphics table indicates addresses accessible by the port 425 may compare the address to addresses indicated by the graphics table to determine whether the address may be accessible to transactions from the port. For instance, the port may comprise a port for a graphics controller and the graphics table may comprise references to addresses in system memory that may be accessed by the graphics port. In such embodiments, comparing the address to a graphics table, wherein the graphics table indicates addresses accessible by the port 425 may determine whether or not a reference for the address is stored in the graphics table.

Determining whether the port has access to the address based upon said comparing 430 may determine that the transaction may proceed based upon whether or not the address of the transaction is indicated by the graphics table as an address accessible by the port. Some embodiments may determine that the transaction may proceed when the address of the transaction is indicated for the source of the transaction. Further embodiments may determine that the transaction may proceed when the address of the transaction is indicated for the type of access represented by the transaction such as a read request or a write request.

Determining whether the port has access to the address based upon said comparing 430 may comprise determining that the address is associated with the memory location based upon said comparing 435 and determining that the address is associated with an unprotected memory location to verify that the address is accessible by the port 440. Determining that the address is associated with an unprotected memory location to verify that the address is accessible by the port 440, after determining that the address is not associated with a protected memory location for the port, may comprise determining that the transaction is permitted in accordance with a definition of protected memory. The definition of protected memory may comprise an associated of protected and/or unprotected memory locations with addresses in system memory or other memory. In many embodiments, when the address is associated with an unprotected memory location, the transaction may proceed. In these embodiments, the unprotected memory location may be accessible to the port although a protected memory location that is not associated with the port may be inaccessible with regards to transactions received via the port.

Further embodiments may comprise blocking the transaction based upon a determination that the address is inaccessible by the port 450. Blocking the transaction based upon a determination that the address is inaccessible by the port 450 may prevent a transaction from completing when the address associated with the transaction is not associated with the port. For example, a read request may be received via the port for an address that is associated with a protected memory location. The protected memory location may be associated with a code module or device that does not transmit transactions via the port. Accesses via the port may be blocked to prevent potentially hostile code from reading and/or writing to the address. Thus, blocking the transaction based upon a determination that the address is inaccessible by the port 450 may prevent data read from the address from being returned to the port in response to the transaction.

Blocking the transaction based upon a determination that the address is inaccessible by the port 450 may comprise resetting part of a platform 455 and responding to the transaction with a pattern of bits 460. Resetting part of a platform 455 may, in some embodiments, reset the system, such as the computer system, security system, or the like after determining that the transaction may not access the address.

Responding to the transaction with a pattern of bits 460 may return bad data or null data in response to the transaction. In other embodiments, no response may be transmitted to the port to hang the system in response to the attack. For example, when the transaction comprises a write request and the address is not associated with the port or an unprotected memory location. The response to the transaction may comprise zeroes or ones. In some embodiments, the response may comprise a pattern of bad data.

Figure 5:
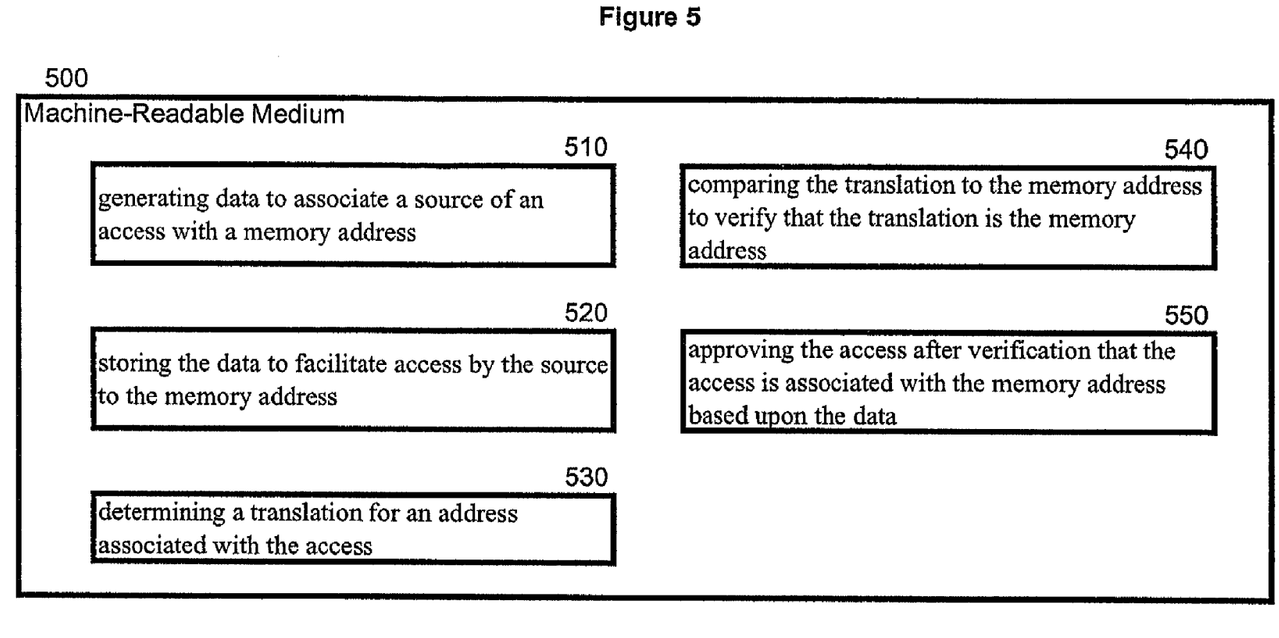
FIG. 5 depicts an embodiment of a machine-readable medium comprising instructions to interface memory.

Referring now to FIG. 5, a machine-readable medium embodiment of the present invention is shown. A machine-readable medium includes any mechanism that provides (i.e. stores and or transmits) information in a form readable by a machine (e.g., a computer), that when executed by the machine, may perform the functions described herein. For example, a machine-readable medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc. . . Several embodiments of the present invention may comprise more than one machine-readable medium depending on the design of the machine.

In particular, FIG. 5 shows an embodiment of a machine-readable medium 500 comprising instructions, which when executed by a machine, cause said machine to perform operations, comprising generating data to associate a source of an access with a memory address 510; storing the data to facilitate access by the source to the memory address 520; determining a translation for an address associated with the access 530; comparing the translation to the memory address to verify that the translation is the memory address 540; and approving the access after verification that the access is associated with the memory address based upon the data 550. Instructions for generating data to associate a source of an access with a memory address 510 may comprise generating the data in response to receipt of a request for a memory location. In some embodiments, instructions for generating data to associate a source of an access with a memory address 510 may comprise generating data in response to receiving a request to define a protected memory location and/or an unprotected memory location. In several of these embodiments, the request may comprise part of secure environment initialization. For instance, a secure environment may require address in system memory to be protected from DMA or from access by devices via a graphics aperture. Part of initialization of the secure environment may request addresses or memory to be protected such that trusted code may reside in a protected memory location and remain uncorrupted by potentially hostile code or device coupled with the system. Generating data to associate a source of an access with a memory address 510 may comprise instructions to select unallocated memory addresses in the system memory and associate those memory addresses with a protected memory location for the trusted code.

Further, instructions for generating data to associate a source of an access with a memory address 510 may comprise determining a definition of protected memory based upon the request for a memory location. The request may comprise or be associated with a source allowed to access the trusted code such as a secure virtual machine monitor (SVMM). SVMM may be trusted to update trusted code for the secure environment.

In further embodiments, the request may comprise a request from a source such as device or code to establish a protected memory location and/or an unprotected memory location for the source. For instance, instructions for generating data to associate a source of an access with a memory address 510 may comprise generating data to associate a protected memory location and/or an unprotected memory location for use by a device such as a bridge. The bridge may comprise an I/O bridge such as a bridge for a PCI bus. For example, the latency of access for the bridge may be reduced by associating memory addresses accessible to the bridge with a memory location for the bridge in accordance with the secure environment and facilitating access to the memory location for that bridge without verifying the access with a secure environment for each access. The bridge may then forward an access to memory logic and the memory logic, based upon the memory location associated with the bridge, may approve the access.

Instructions for storing the data to facilitate access by the source to the memory address 520 may comprise instructions to generate a table of memory addresses or of data associated with memory addresses accessible by the source. Verification circuitry may compare an access from the source with the table to determine whether the source may read from and/or write to the address associated with the access. After verifying that the source may read from the memory location associate with the access, the verification circuitry may approve the access. On the other hand, when the address associated with the access is not found in the table, the verification circuitry may withhold approval for the access and the access may be ignored, responded to with an error, or forwarded to the secure environment to determine whether the access may be approved.

Instructions for determining a translation for an address associated with the access 530 may translate an address of the access via an address translation table to determine whether the address is associated with the source of the access. For instance, a graphics device may initiate an access with an abbreviated memory address for a system memory address. Verification circuitry may receive the access, interpret the address via the address translation table associated with the graphics device and determine whether the access is approved for the system memory address.

Instructions for comparing the translation to the memory address to verify that the translation is the memory address 540 may comprise instructions to determine whether an address in system memory is approved for access by a source after receiving a translation of the address of the access by comparing the translated address to a memory location associated with the source. For example, the source may comprise the operating system and an access by the operating system may comprise an alias for an address associated with a memory location accessible by the operating system. The access, for instance, may comprise a request to read an address associated with a protected memory location for the secure environment. A table generated to associated the operating system with memory accessible to the operating system may associate the operating system with the memory address with an indication that the operating system may read the protected memory location. Verification circuitry may check the table, determine that a read request conforms to the definition of protected memory for the secure environment, and determine that the access is a read to approve the access based upon the translated address associated with the access.

In further embodiments, comparing the translation to the memory address to verify that the translation is the memory address 540 may comprise instructions for determining a translated address associated with the access comprises an address to an address translation table. In many of these circumstances, if the access is a write, the data associated with the access may be further compared with the address translation table to determine whether the new address translation may translate a memory address of a protected memory location to an unprotected memory location or vice versa. For instance, a hostile source may attempt to modify an address translation table to cause a write to a protected memory location to be written to an unprotected memory location. Writing to the unprotected memory location may allow a hostile source to gain access to the protected memory. On the other hand, a hostile source may attempt to modify an address translation table to translate an access to an unprotected memory location. Modifying the address translation may allow the source to access a protected memory location with an address associated with an unprotected location, circumventing the protection for the memory address. In many of these instances, comparing the translation to the memory address to verify that the translation is the memory address 540 may cause the access may fail to verify and thus the access may not be approved or approval may be withheld.

Instructions for approving the access after verification that the access is associated with the memory address based upon the data 550 may comprise allowing an access to be performed based upon a determination that the access is approved for the source at the memory address associated with the access. In some embodiments, approving the access after verification that the access is associated with the memory address based upon the data 550 may comprise withholding approval when the access is not verified and/or may comprise initiating a protection mechanism.

Some embodiments may further comprise instructions to facilitate the access. Instructions to facilitate the access may comprise instructions to perform the access of the memory address and, in many embodiments, return a completion to the source to indicate that the access is completed. In some instances, the completion may comprise an indication that a write to the memory address has been executed and, in other circumstances, the completion may comprise data read from the memory address.

What is claimed is:

1. A method, comprising:
   receiving by a hub a transaction from a port;
   comparing an address associated with the transaction to a memory location associated with the port; and
   determining by the hub whether the port has access to the address without requesting verification by a processor based upon said comparing of said memory location by determining whether the transaction is associated with a protected memory location, and if so, determining that the transaction is permitted in accordance with a definition of protected memory being an association of memory locations with addresses in memory.

2. The method of claim 1, further comprising blocking the transaction based upon a determination that the address is associated with protected memory that is inaccessible by the port.

3. The method of claim 2, wherein blocking the transaction comprises resetting part of a platform.

4. The method of claim 2, wherein blocking the transaction comprises responding to the transaction with a pattern of bits.

5. The method of claim 1, wherein said comparing comprises comparing the address to a graphics table, wherein the graphics table indicates addresses accessible by the port.

6. The method of claim 1, wherein said determining comprises determining that the address is associated with an unprotected memory location to verify that the address is accessible by the port.

7. The method of claim 1, wherein the transaction is a request from a thread operating on a processor.

8. The method of claim 1, wherein the hub is coupled to the processor and the memory.

9. The method of claim 8, wherein the hub is further coupled to a graphics device.

10. The method of claim 9, wherein the hub is further coupled to an input/output device.

11. An apparatus communicatively coupled to both a processor and an input/output (I/O device), comprising:
    a port to receive an access including an alias for a memory address, said port being one of a plurality of ports being coupled to one of the processor and the I/O device;
    comparison circuitry coupled with said port to translate the alias based upon an entry in an address translation table and to compare the translate address with address accessible by said port; and approval circuitry to determine whether to block the transaction based upon the address in response to said comparison circuitry.

12. The apparatus of claim 11, wherein said comparison circuitry comprises circuitry to determine whether the address is associated with an unprotected memory location.

13. The apparatus of claim 11, wherein said approval circuitry comprises circuitry to approve the transaction based upon a determination that the address is accessible by said port.

14. The apparatus of claim 11, wherein the access is a request from a thread operating on the processor.

* * * * *